Figure 1:
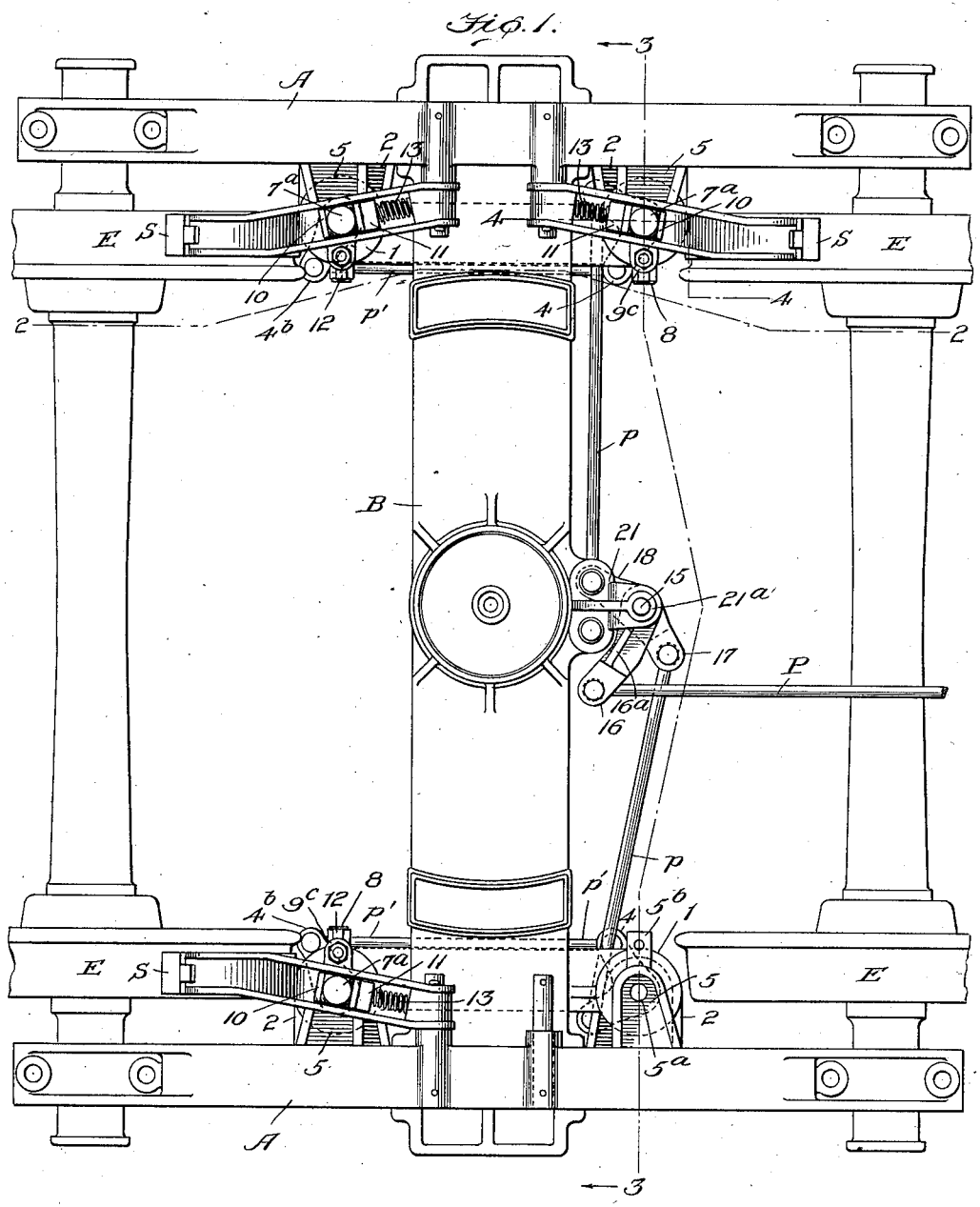

H. C. BUHOUP.
BRAKE MECHANISM.
APPLICATION FILED JULY 30, 1913.

1,093,683.

Patented Apr. 21, 1914.

3 SHEETS—SHEET 1.

Witnesses
Edwin L. Bradford.
H. S. Shepard.

Inventor
Harry C. Buhoup
By Ritter & Ritter
his Attorneys

H. C. BUHOUP.
BRAKE MECHANISM.
APPLICATION FILED JULY 30, 1913.
1,093,683.
Patented Apr. 21, 1914.
3 SHEETS—SHEET 2.
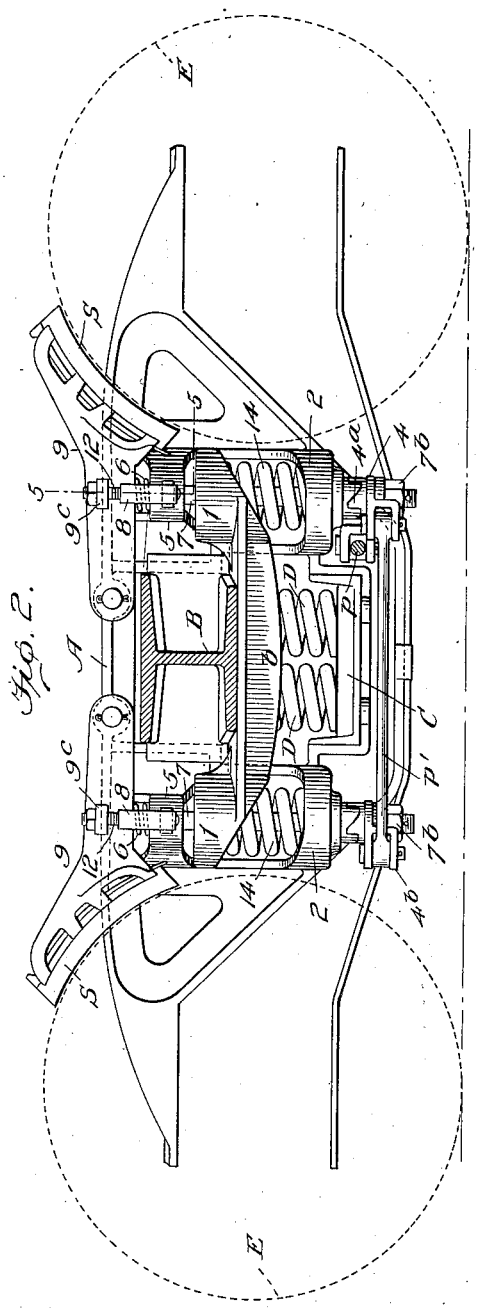
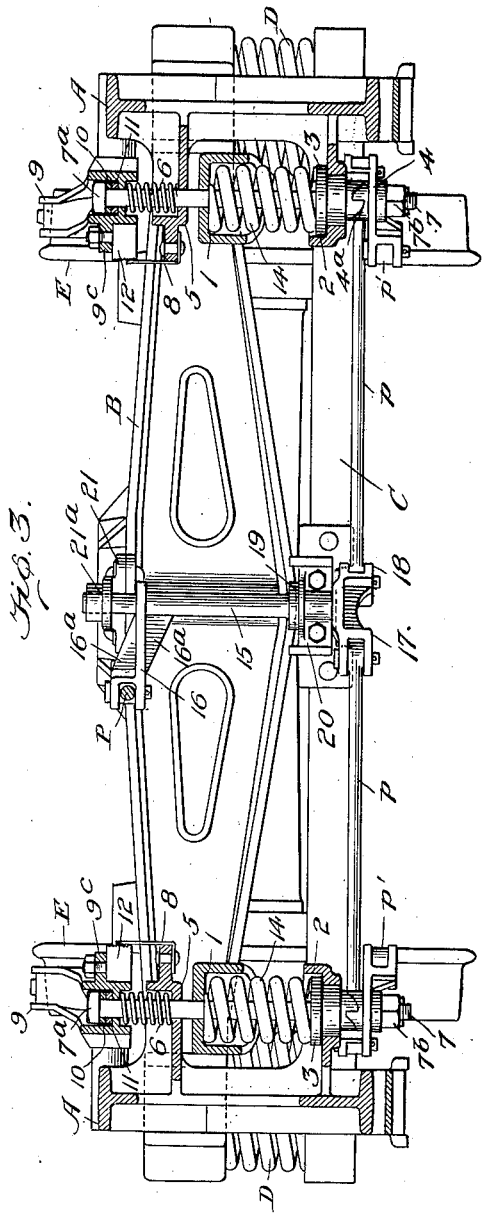

H. C. BUHOUP.
BRAKE MECHANISM.
APPLICATION FILED JULY 30, 1913.
1,093,683.
Patented Apr. 21, 1914.
3 SHEETS—SHEET 3.
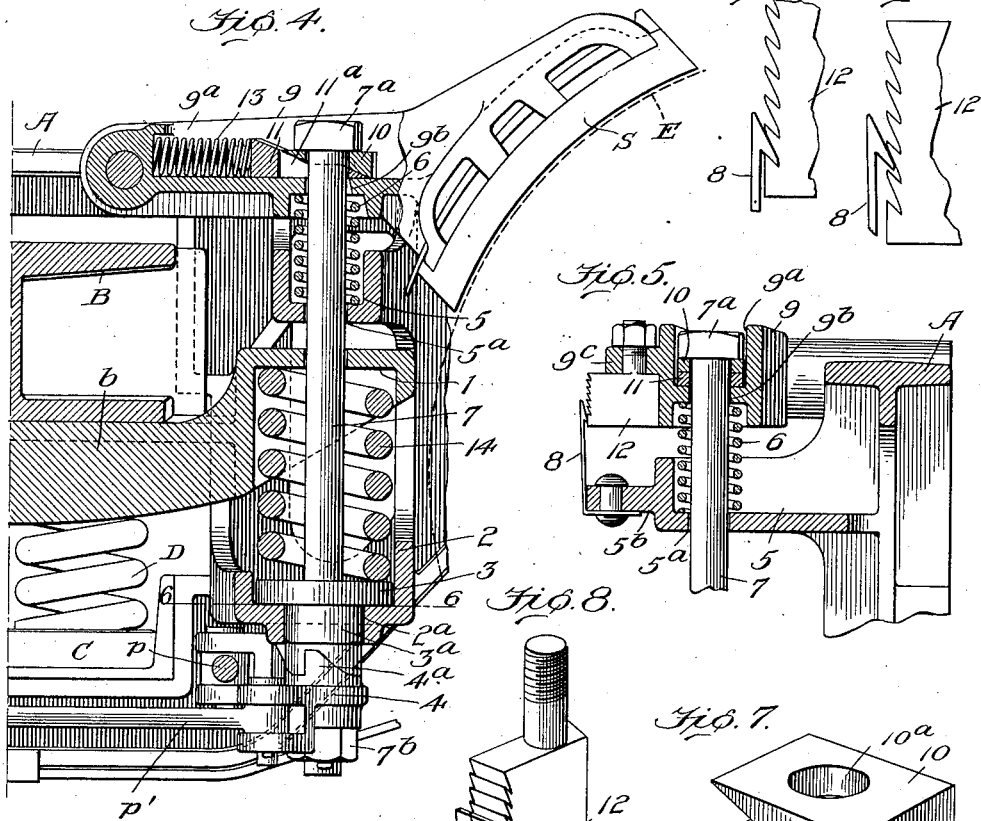
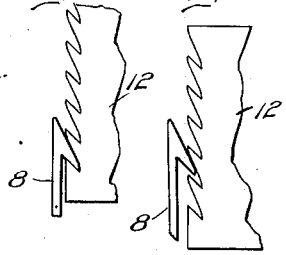
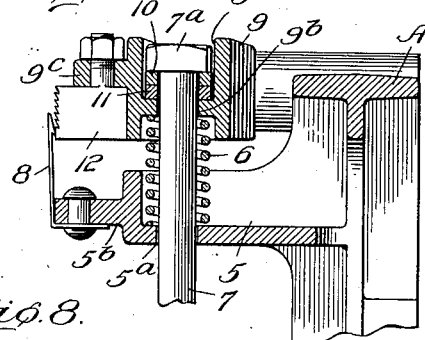
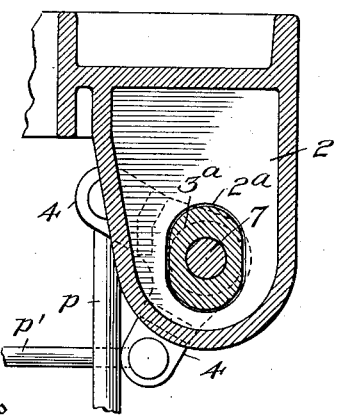
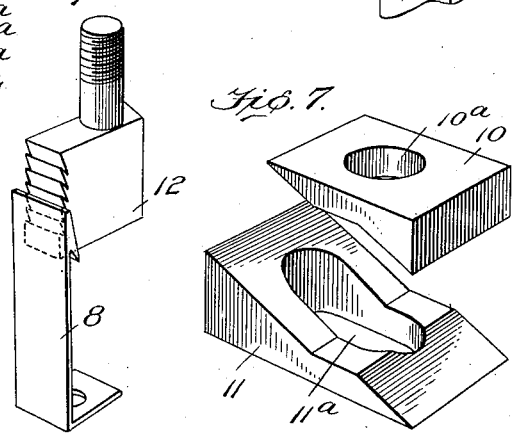
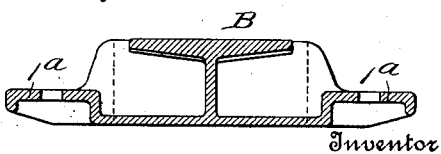
Witnesses
Edwin L. Bradford
H. D. Shepard
Inventor
Harry C. Buhoup
By Ritter & Ritter
his Attorneys

UNITED STATES PATENT OFFICE.

HARRY C. BUHOUP, OF CHICAGO, ILLINOIS.

BRAKE MECHANISM.

1,093,683.     Specification of Letters Patent.     Patented Apr. 21, 1914.

Application filed July 30, 1913. Serial No. 781,955.

*To all whom it may concern:*

Be it known that I, HARRY C. BUHOUP, a citizen of the United States, residing at Chicago, in the county of Cook and State of Illinois, have invented certain new and useful Improvements in Brake Mechanism; and I do hereby declare the following to be a full, clear, and exact description of the invention, such as will enable others skilled in the art to which it appertains to make and use the same.

My invention relates to the construction of that class of brake-mechanism wherein the weight of the car determines and controls the braking pressure exerted on the wheels, and has for its object the direct application of the weight of the car and its load to the brake-shoe carrying means.

As is well understood by those skilled in railway practice, a braking pressure which is sufficient for an empty or lightly loaded car will prove insufficient to efficiently check the momentum of a heavily loaded car, while a braking pressure requisite to properly check the momentum of a heavily loaded car, if applied directly to the brake-shoes of an empty or lightly loaded car, may result in sliding the wheels thereof on the rails, the consequent production of flat spots on the wheels thus necessitating frequent renewals, and causing other deterioration of the rolling stock, which adds materially to the cost of maintenance.

To overcome the several injurious effects due to the direct application of a large braking power to the brake shoes, various constructions have heretofore been devised for balancing the weight of the car or the car and its load against the braking power, to thus control the amount of the brake-shoe pressure that is exerted on the wheels; but, so far as I am aware, this balancing of the weight of the car against the braking power has heretofore been effected through lever systems.

My present invention involves the principle of transmitting the load of the car directly to the brake-shoe carrying member, or, in other words, effects the direct suspension or support of the car on the member or members which carry the brake shoes in such manner that the power for applying the brakes is utilized to cause said suspension or supporting action to occur at the time of the application of the brakes. Under such an application of forces the brake-shoe pressure exerted on the wheels is directly proportional to the weight of the car and its load.

My present invention is directed largely to the simplification of the mechanism for applying this principle, whereby the cost of installation and maintenance is reduced and the efficiency of the mechanism is increased.

To this end, the principal feature of my invention involves the combination, in a car-truck, of a side-frame, wheels, a bolster having laterally projecting arms extending beyond the bolster-opening of the side frame, brake-shoe carrying means supported on the truck, means for supporting or suspending the bolster from the brake-shoe carrying means, and means for shifting the bolster load to the brake-shoe carrying means when the braking power is applied.

A secondary feature of my invention involves the combination, in a car-truck, of a side-frame, wheels, a bolster having laterally projecting arms provided with spring seats extending beyond the bolster-opening of the side frame, brake-shoe carrying means supported on the truck, springs which engage the laterally disposed spring seats, means for supporting or suspending the bolster from the brake-shoe carrying means, and means for shifting the bolster load to the means which carry the brake-shoes when braking power is applied.

A further feature of my invention involves the combination, in a car truck, of a side-frame, wheels, a bolster, brake-shoe carrying means supported on the car-truck, means for supporting or suspending the bolster from the brake-shoe carrying means, means for shifting the bolster load to the brake-shoe carrying means when braking power is applied, and means interposed between the bolster and the brake-shoe carrying means for taking up the lost motion incident to brake-shoe wear.

There are also other features of invention, involving particular combinations of elements as well as features of elemental construction, all as will hereinafter more fully appear.

In the drawings illustrating this invention, the scope whereof is pointed out in the claims, Figure 1 is a plan view of a car-truck and brake-mechanism embodying my invention. Fig. 2 is a side view of the side-frame, and brake mechanism embodying my invention, showing also a sectional view of the bolster, and indicating in dotted lines the position of the wheels, the view being taken on the line 2—2, Fig. 1. Fig. 3 is a side view of the bolster and a sectional view of the brake-mechanism, the view being taken on the line 3—3, Fig. 1. Fig. 4 is a detail sectional view of portions of the side-frame, bolster and brake-mechanism which together constitute one of the operative units of coacting elements, the view being taken on the line 4—4, Fig. 1. Fig. 5 is a detail sectional view of the slack-adjuster devices, taken in the plane of the line 5—5, Fig. 2. Fig. 6 is a horizontal sectional view of a portion of the side-frame and an attached spring chamber, taken in the plane of the line 6—6, Fig. 4. Fig. 7 is a detail perspective view of the wedge and wedge slide of the slack-adjuster devices. Fig. 8 is a detail perspective view of the spring detent and rack of the slack take-up or slack adjuster devices. Fig. 9 is a transverse section of one end of a bolster showing how the laterally disposed arms or spring seats may be formed integral with the bolster, if desired. Fig. 10 is a detail diagrammatic view illustrating the relation of the detent and ratchet bar of the slack adjuster when the parts are initially assembled and the brakes are off. Fig. 11 is a detail diagrammatic view illustrating the relation of the detent and ratchet bar of the slack adjuster when slack in the brake mechanism, due to wear of the brake-shoes, is being taken up.

Like symbols refer to like parts wherever they occur.

I will now proceed to describe my invention more fully, so that others skilled in the art to which it appertains may apply the same.

In the drawings, A indicates the side-frame, B the bolster, C the spring-plank, D the usual bolster springs, and E the wheels of a car truck. Inasmuch as the brake mechanism is the same upon both side-frames of the truck, and the mechanisms on opposite sides of the bolster opening of each side-frame are also substantially alike, it will suffice for the purposes of this specification to describe only the mechanism carried by the side-frame on one side of the bolster opening.

In carrying out my invention I provide projecting arms with spring seats 1 at each end of and laterally disposed with relation to the bolster B. The opposite spring-seats 1, 1 at each end of the bolster may be conveniently connected by a member $b$ constituting a saddle on which the end of the bolster rests, as shown in the principal figures of the drawings, or, if desired, said spring-seats may be formed integral with the bolster, as shown at $1^a$ in Fig. 9 of the drawings.

Attached to the side-frame A and laterally disposed with relation to the bolster opening therein, are spring chambers 2 which are arranged below and preferably in vertical alinement with the spring-seats 1, 1, and which are open at the top and bottom, the bottom opening $2^a$ being preferably of such shape, as, for example, of oval form, as will prevent the rotation of a disk 3 having an annular stud or boss which the said opening $2^a$ receives.

3 indicates an annular disk which is provided on its under side with a centrally disposed annular stud or boss $3^a$ that constitutes a bushing which enters the opening $2^a$ in the bottom of the spring-chamber 2. This disk 3 forms a movable seat for a spring 14 whose upper bearing is the seat 1 connected with the side of the bolster B.

The lower edge of the annular stud or boss $3^a$ is in the form of a helix or cam face which coacts with a corresponding cam face on the upper edge of an annular boss $4^a$ that is secured to an elbow lever or bell crank lever 4 at the angle or pivotal point of the latter.

Attached to or formed integral with the side-frame A, and, as shown, preferably located above the lateral bolster arm and its seat 1, is another and somewhat smaller spring chamber 5 for the reception of a brake-release spring 6. This spring chamber 5 is open at its top and has an opening $5^a$ in its bottom to permit the passage of the bolster suspension rod 7. It preferably has also, on its outer side, a short arm or lug $5^b$ to which is secured a spring detent or ratchet 8 that coacts with a toothed block or ratchet bar 12 which is mounted upon the side of the brake-shoe carrying means 9.

Yieldingly supported upon the brake-release spring 6 is a member 9 which is the means for carrying the brake-shoe S. Each brake shoe has its own separate or independently movable carrying member 9. This member 9, which in the present instance is shown as pivotally connected to the side-frame, may be and preferably is channeled on its upper surface, as at $9^a$, for the reception and retention of a stationary wedge 10 and a movable wedge 11 that form a part of the slack-take up or slack adjuster devices; and it is also preferably perforated, as at $9^b$, for the passage of the bolster-suspension rod 7. On one side of and in line with the opening $9^b$ for the passage of the bolster suspension rod 7, the pivoted arm or lever 9 is provided with a perforated projection or lug $9^c$ to which is secured a ratchet bar 12 with which the ratchet or detent 8 that is carried by spring chamber 5 coacts.

10 and 11 indicate relatively sliding wedges arranged in the channel 9ª on the upper surface of the brake-shoe carrying means 9. These wedges are preferably of the form shown, that is to say, each is provided with two inclines separated by a horizontal plane. The upper wedge or fixed wedge 10 has a cylindrical hole 10ª for the passage of the bolster suspension rod 7, and the lower wedge 11 has an elongated slot 11ª for the passage of rod 7, the purpose of which is to restrain the movement of wedge 10 on which the head 7ª of the rod 7 bears while permitting a sliding movement of the wedge 11.

A coiled spring 13 is arranged in the way or channel 9ª of pivoted arm 9, back of the lower or sliding wedge 11. This spring serves to force the wedge 11 under the upper wedge 10 to take up slack arising from brake-shoe wear.

The bolster suspension rod 7, it will be noted, passes directly downward through the wedges 10 and 11, the brake-shoe carrying means 9, the brake-release spring 6 and its chamber 5, thence through the spring seat 1 of the bolster B, through the spring 14, the movable spring seat or bushing 3 and coacting cam members 3ª, 4ª, and is finally secured in position by means of a nut 7ᵇ beneath the bell crank lever 4 to which the cam faced boss 4ª is attached.

The operation of the unit of coacting elements hereinbefore described is as follows: The nut 7ᵇ on the bolster suspension rod 7 having been turned until the brake-shoe S on the brake-shoe carrying means 9 is at the desired distance from the wheel when the brakes are off, braking power applied to the bell-crank lever 4 rotates the cam member 4ª on the corresponding cam member 3ª of the movable spring seat 3. The initial rotation of the cam 4ª thus draws the suspension rod 7 downwardly, thereby moving the brake-shoe carrying member 9 in the same direction and compressing the release spring 6 until the brake-shoe S engages the wheel E. The subsequent rotation of the cam member 4ª forces the movable spring seat 3 to slide upwardly upon the bolster suspension rod 7 against the pressure of the spring 14. As the spring 14 bears against the spring seat 1 of the bolster, the reaction to the downward pull exerted upon the suspension rod 7 is transmitted to and limited in amount by the bolster B and its superposed load, and the bolster load is thus transferred through the suspension rod 7 directly to the brake-shoe carrying means 9.

As before noted, the four units constituting the brake mechanism for a truck are substantially alike and operate alike, the only difference being that two of the cam members 4ª are actuated by bell crank levers 4 while the other two cam members 4ª are actuated by simple levers 4ᵇ having but a single arm. It therefore only remains to describe the machanism for establishing a simultaneous action of the units when the braking power is applied.

15 indicates a staff or post, having near its upper end a crank arm 16, which may be braced by ribs 16ª, and being provided at its lower end with two crank arms, 17 and 18, which preferably form a bell crank lever. A short distance above the crank arms 17 and 18 the post 15 is provided with a collar 19, beneath which is a divided journal bearing 20 that is bolted or otherwise secured to the spring plank C and forms the lower bearing for said post. The upper journal bearing for the post 15 is formed by a bracket 21 which is secured to the bolster B and has a journal boss 21ª for the reception of the upper end of the post. The height of the journal bearing 21ª above the crank arm 16 on the post is sufficient to freely permit the usual vertical movements of the bolster.

The connection of the air brake cylinder piston (not shown) with the crank arm 16 is preferably made by means of the usual brake rod P. The braking power thus applied is transmitted through the rotary post 15 and the crank arms 17 and 18 to rods $p$, $p$ which are respectively connected to the bell crank levers 4, 4 on opposite sides of the truck; and from the bell crank levers 4 the power is transmitted to the levers 4ᵇ on corresponding sides of the truck by means of rods $p'$, $p'$ which connect the respective levers 4 and 4ᵇ. It will be noted that the cams 4ª of the several units are thus simultaneously actuated by the braking power, to simultaneously shift the load of the bolster to the suspension rods 7 of the several units and, through said suspension rods, to the brake-shoe carrying means.

When, by reason of wear of the brake-shoe S, the brake-shoe carrying means 9 is required to exceed a predetermined range of movement in order to cause the brake-shoe S to engage the wheel in applying the brakes, such excessive downward movement of the brake-shoe carrying means 9 will cause the ratchet bar 12 to move downwardly to an extent sufficient to permit the toothed head of the spring detent 8 to pass the next tooth of the ratchet bar and occupy the relation with respect thereto indicated in Fig. 11, the distance between the teeth of the ratchet bar, as will be readily understood, being governed by the increments of wear to be successively taken up. Thereafter when the brakes are released the release spring 6 will force the brake-shoe carrying means 9 and attached ratchet bar 12 upwardly until their movement is arrested by the head of the detent 8, at which time the clearance between the brake-shoe S and its wheel E will be precisely the same as was the case before the brake-shoe had been worn by service. The brake-shoe carrying means 9 being thus prevented from any further upward movement and the suspension rod 7 being at that time free from the strain due to braking pressure, the spring 13 acting upon the sliding wedge 11 will force the latter under the fixed wedge 10 until the upper surface of said fixed wedge bears firmly against the under surface of the head $7^a$ of the suspension rod 7, the effective length of the latter being thus decreased an amount corresponding to the increment of brake-shoe wear. When through further wear upon the brake-shoe S the travel of the brake-shoe carrying means 9 again exceeds the predetermined maximum, the tooth of the detent 8 passes another of the teeth of the ratchet bar 12 and the slack due to brake-shoe wear is again eliminated from the mechanism.

I claim:

1. The combination in a car-truck, of a side-frame having a bolster opening therein, wheels, a bolster having laterally projecting arms extending beyond the bolster opening of the side-frame, brake-shoe carrying means supported on the truck, means capable of supporting the bolster from the brake-shoe carrying means, and means for shifting the bolster load to the brake-shoe carrying means when the braking power is applied.

2. The combination in a car-truck, of a side-frame having a bolster opening therein, wheels, a bolster having laterally projecting arms provided with spring seats extending beyond the bolster opening of the side frame, brake-shoe carrying means supported on the truck, springs which engage the laterally disposed spring seats, means involving said springs and capable of supporting the bolster from the brake-shoe carrying means, and means for shifting the bolster load to the means which carry the brake-shoes when braking power is applied.

3. The combination in a car truck having a bolster opening therein, of a side-frame, wheels, a bolster provided with a saddle having spring seats extending beyond the bolster opening of the side frame, springs which engage the laterally disposed spring seats, movable spring seats supported on the side-frame, brake-shoe carrying means supported on the truck, rods adapted to support the bolster from the brake-shoe carrying means, and means for shifting the bolster load to the brake-shoe carrying means when braking-power is applied.

4. The combination in a car-truck of a side frame having laterally disposed spring chambers, wheels, a bolster having laterally disposed spring seats, movable spring seats in the spring chambers of the side-frame, springs which engage the spring seats of the bolster and the movable spring seats in the spring chambers, brake-shoe carrying means supported on the truck, rods adapted to support the bolster from the brake-shoe carrying means, and means for shifting the bolster load to the brake-shoe carrying means when braking-power is applied.

5. The combination in a car-truck, of a side frame having laterally disposed spring chambers, wheels, a bolster having laterally disposed spring seats, movable spring seats arranged in the spring chambers of the side-frame, said movable spring seats each having a cam, springs which engage the movable spring seats and the laterally disposed spring seats of the bolster, cam members coacting with the cam members of the movable spring seats, brake-shoe carrying means supported on the truck, and rods adapted to support the bolster from the brake-shoe carrying means.

6. The combination in a car-truck, of a side frame, wheels, a bolster, independently movable brake-shoe carrying means supported on the truck, means capable of supporting the bolster from the brake-shoe carrying means, means for shifting the bolster load to the brake-shoe carrying means when the braking power is applied, and means interposed between the bolster and the brake-shoe carrying means for automatically taking up the lost motion incident to brake-shoe wear.

7. The combination in a car-truck, of a side frame, wheels, a bolster, independently movable brake-shoe carrying means supported on the truck, means capable of supporting the bolster from the brake-shoe carrying means, means for shifting the bolster load to the brake-shoe carrying means when the braking power is applied, relatively movable wedges interposed between the bolster and the brake-shoe carrying means, said wedges operating to take up the lost motion incident to brake-shoe wear, and means for automatically causing the relative movement of said wedges.

8. The combination in a car-truck, of a side frame, wheels, a bolster, independently movable brake-shoe carrying means supported on the truck, means capable of supporting the bolster from the brake-shoe carrying means, means for shifting the bolster load to the brake-shoe carrying means when braking power is applied, and means mounted on the brake-shoe carrying means for automatically taking up the lost motion incident to brake-shoe wear.

9. The combination in a car-truck, of a side frame, wheels, a bolster, independently movable brake-shoe carrying means supported on the truck, means capable of supporting the bolster from the brake-shoe carrying means, means for shifting the bolster load to the brake-shoe carrying means, means mounted on the brake-shoe carrying means for taking up the lost motion incident to brake-shoe wear, and means supported on the truck for moving the brake-shoe carrying means away from the wheels when the brakes are released.

10. The combination in a car-truck, of a side frame, wheels, a bolster, independently movable brake-shoe carrying means, means capable of supporting the bolster from the brake-shoe carrying means, means for shifting the bolster load to the brake-shoe carrying means when braking power is applied, relatively movable wedges and a spring mounted on the brake-shoe carrying means, and means for taking up the lost motion incident to brake-shoe wear, said means including a ratchet and rack.

11. The combination in a car-truck, of a side frame having a bolster opening therein, wheels, a bolster having laterally disposed spring seats which extend beyond the bolster opening of the side-frame, movable spring seats supported on the side frame, springs interposed between the laterally disposed spring seats of the bolster and the movable spring seats, release springs supported on the side-frame, brake-shoe carrying means supported on the truck, a rod adapted to support the bolster and first named springs from the brake-shoe carrying means, and means for shifting the bolster load to the brake-shoe carrying means when braking power is applied.

12. The combination in a car-truck, of a side frame having a bolster opening therein, wheels, a bolster having laterally disposed spring seats which extend beyond the bolster opening of the side frame, laterally disposed springs engaging said spring seats, movable spring seats for said springs, said movable spring seats being supported on the side-frame, independently movable brake-shoe carrying means supported on the truck, release springs for the brake-shoe carrying means, said release springs being supported on the side-frame, means capable of supporting the first named springs and bolster from the brake-shoe carrying means, means for shifting the bolster load to the brake-shoe carrying means when braking power is applied, and means for taking up the lost motion incident to brake-shoe wear, said last recited means including spring actuated relatively movable wedges, a ratchet and a rack bar mounted in part on the brake-shoe carrying means and in part on the side-frame.

13. The combination in a car-truck, of a side frame, wheels, a brake-shoe, independently movable brake-shoe carrying means, and devices mounted upon the side frame and upon said brake-shoe carrying means for automatically taking up lost motion incident to brake-shoe wear.

In testimony whereof I affix my signature, in the presence of two subscribing witnesses.

HARRY C. BUHOUP.

Witnesses:
D. B. MASON,
HARRY W. STANNARD.

Copies of this patent may be obtained for five cents each, by addressing the "Commissioner of Patents, Washington, D. C."